United States Patent Office 3,490,653
Patented Jan. 20, 1970

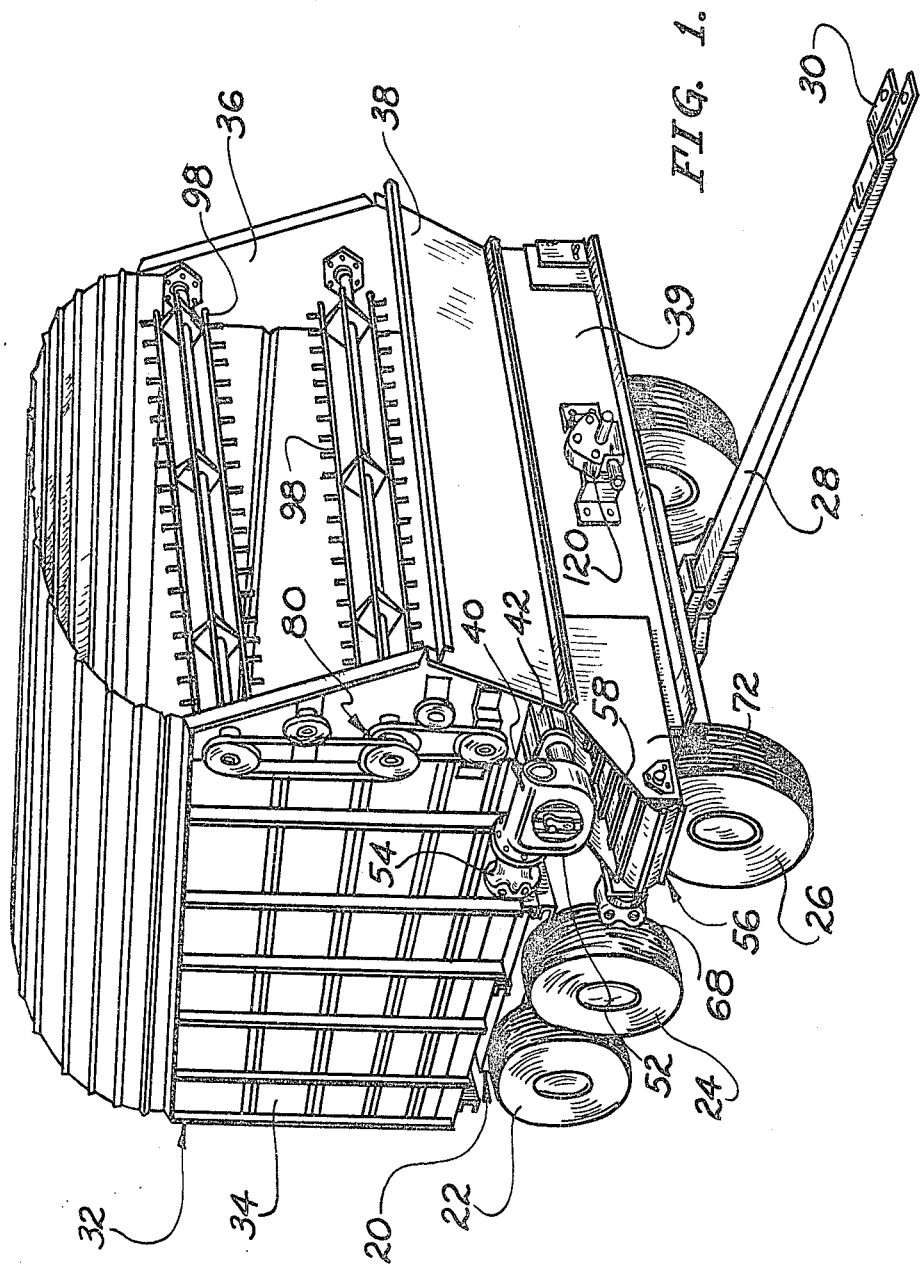

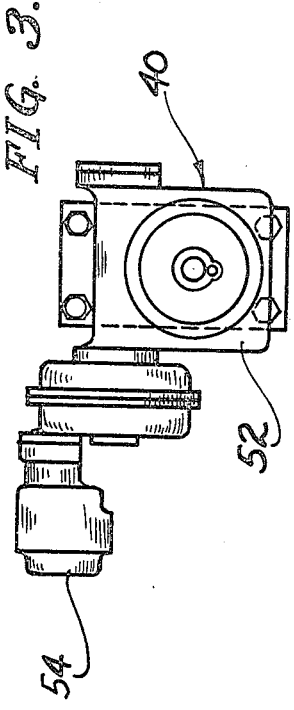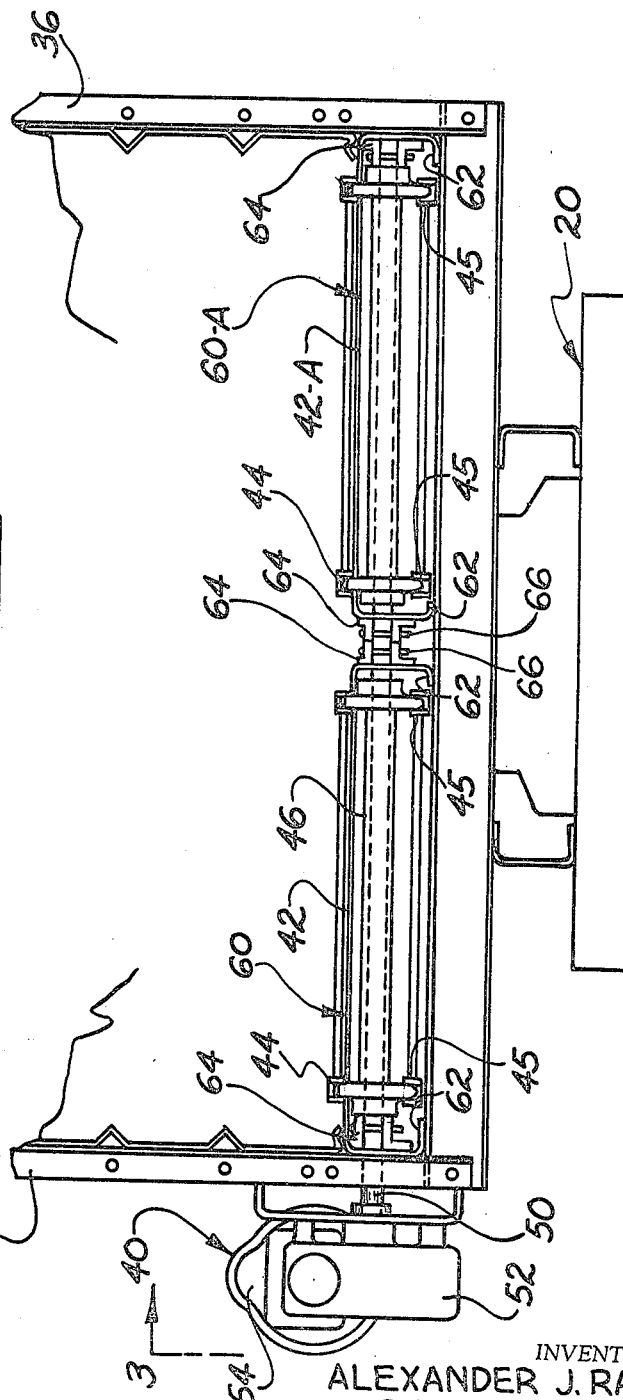

3,490,653
CROP AND FORAGE VEHICLE
Alexander J. Raitch, Mansfield, and Donal W. Chaney, Galion, Ohio, assignors to Harsco Corporation, Harrisburg, Pa., a corporation of Delaware
Filed Jan. 2, 1968, Ser. No. 694,977
Int. Cl. B60p 1/00
U.S. Cl. 222—178                             19 Claims

ABSTRACT OF THE DISCLOSURE

A wagon type vehicle for transporting and automatically unloading crop, forage and the like of the type that includes a floor conveyor for transporting material longitudinally of the floor of the vehicle body, beaters at one end of the body for mixing and decompacting the material, and a cross-conveyor for discharging the material from the body. The vehicle is further characterized by hydraulic driving means for each of the above mentioned conveyors and beaters and associated hydraulic control means for independently varying the relative speeds of each conveyor and the beaters.

---

This invention relates to crop and forage vehicles, and more particularly to a novel machine of this type that includes hydraulically actuated conveyor and beater apparatus.

In general the crop and forage vehicle of the present invention comprises a wagon type apparatus which includes a draw bar for attachment to a tractor or other towing vehicle.

The vehicle includes a wheeled frame that supports a body which includes side walls, end walls and a floor, the latter including an endless conveyor for moving crop or forage material longitudinally in the body to a cross conveyor and overlying beaters adjacent an end wall of the vehicle.

The beaters serve to decompact and mix the crop or forage material, and the cross conveyor serves to discharge the material from the body, either to the ground, or to an elevating conveyor external of the body.

In the handling of different types of crop and forage materials, having different densities and moisture contents, it has been determined to be most advantageous to be able to vary the speeds, with respect to one another, of the above mentioned floor conveyor, cross conveyor, and beaters.

As one aspect of the present invention, each of the conveyors, as well as the beater apparatus, is arranged to be independently driven by a respective drive shaft and fluid motor.

Pressurized fluid for the motors is supplied by a hydraulic pump mounted on the crop and forage vehicle and the pump is arranged to be driven by a power take-off shaft connected to the towing vehicle or by other suitable power means.

As another aspect of the present invention, variable flow control apparatus is arranged to permit an operator to selectively vary the speeds of the two conveyor motors, as well as the beater motor so as to establish the most efficient relative speed ratios between the three functions.

As a result of the above the vehicle is adapted to most efficiently handle flail-chopped and other longcut hay. Also, it provides more thorough mixing of feed supplement and ensilage preservatives.

The vehicle is further versatile in that it can be combined with external elevators, conveyors, or blowers to most efficiently deliver a load to a bunker or silage blower.

As another aspect of the present invention the crop and forage vehicle includes a novel hydraulic safety apparatus that prevents overload or possible jamming of the conveyor or beater mechanism by a rock or similar hard object.

As still another aspect of the present invention the crop and forage vehicle includes novel hydraulic safety apparatus that prevents the imposition of sudden high stresses on the floor conveyor when the hydraulic drive is de-energized.

It is therefore an object of the present invention to provide a crop and forage vehicle that includes material handling conveyors and beaters that are driven in a unique manner so as to be independently variable in speed whereby various crop and forage materials can be selectively and efficiently handled by a single vehicle.

It is another object of the present invention to provide a crop and forage vehicle that includes a self-contained hydraulic system for varying the speeds of various components of the apparatus.

It is another object of the present invention to provide a crop and forage vehicle that includes novel hydraulically driven conveyor and beater apparatus that is adapted to be detachably coupled to the power take-off shaft of a conventional farm tractor.

Further objects and advantages of the present invention will be apparent from the following description, reference being had to the accompanying drawings wherein preferred forms of embodiments of the invention are clearly shown.

In the drawings:

FIG. 1 is perspective view of a crop and forage vehicle constructed in accordance with the present invention;

FIG. 2 is an end elevational view, partially in section, of a floor conveyor and drive assembly comprising a portion of the vehicle of FIG. 1;

FIG. 3 is a side elevational view of the floor conveyor and drive assembly of FIG. 2;

Figure 4:
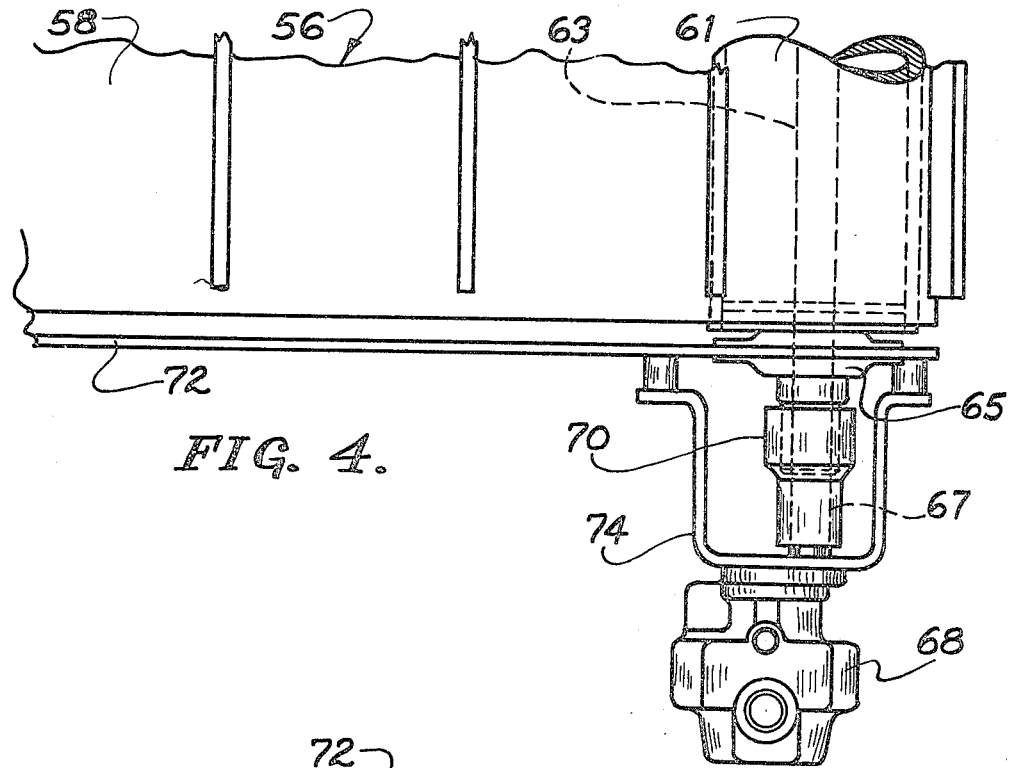
FIG. 4 is a partial top elevational view of a cross conveyor and drive assembly comprising a portion of the vehicle of FIG. 1.

Referring in detail to the drawings, FIG. 1 illustrates a crop and forage wagon constructed in accordance with the present invention which includes a main frame indicated generally at 20, rear wheels 22, center wheels 24 and front wheels 26.

Front wheels 26 are steerable by means of draw bar 28 adapted to be attached to a farm tractor or other towing vehicle at a hitch 30.

With continued reference to FIG. 1, the vehicle further includes a body indicated generally at 32 that comprises right and left side walls 34 and 36, a front wall 38 and a conventional rear wall which may be in the form of a conventional tailgate, not illustrated.

Referring particularly to FIGS. 1 through 3, the vehicle is provided with a floor conveyor and drive assembly indicated generally at 40 that includes two floor conveyor belts 42 and 42–A that are respectively mounted on conveyor frame assemblies indicated generally at 60 and 60–A. These belts and conveyor frame assemblies are disposed in side by side relationship as is best seen in FIG. 2.

As seen in FIG. 2, which illustrates the front portions of the conveyor frame assemblies, a drive shaft 46 is detachably journaled in bearing brackets indicated generally at 64.

With continued reference to FIGS. 1 and 2, conveyor belts 42 and 42-A include link chain portions 45 that are mounted on drive sprockets 44 keyed to drive shaft 46 and an end of drive shaft 46 is detachably keyed to a speed reduction gear box 52 by a coupling 50. Gear box 52 is in turn driven by a fluid motor 54 connected to a pump 120, FIG. 1, which in turn can be driven by the power take-off shaft of the towing vehicle, or by other suitable drive means.

Figure 5:
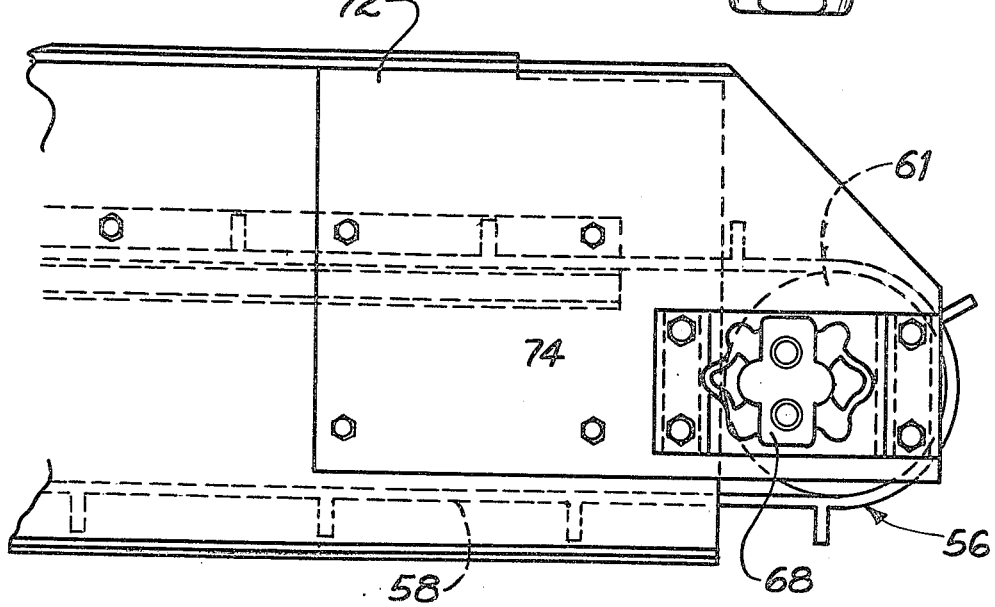
FIG. 5 is a partial side elevational view of the cross conveyor and drive assembly of FIG. 4.

Referring next to FIGS. 1, 4, and 5, the crop and forage vehicle further includes a cross conveyor and drive assembly indicated generally at 56 that includes an endless conveyor 58 mounted on pulleys one of which is indicated at 61 in FIGS. 4 and 5.

One of the pulleys 61 is mounted on a drive shaft 63 journaled in bearings 65 and the end of the shaft is coupled to a drive shaft 67 of a fluid motor 68 by means of a coupling 70.

Fluid motor 68 shall be referred to herein as the cross conveyor fluid motor and is mounted on a conveyor frame member 72 by means of a bracket 74.

Figure 6:
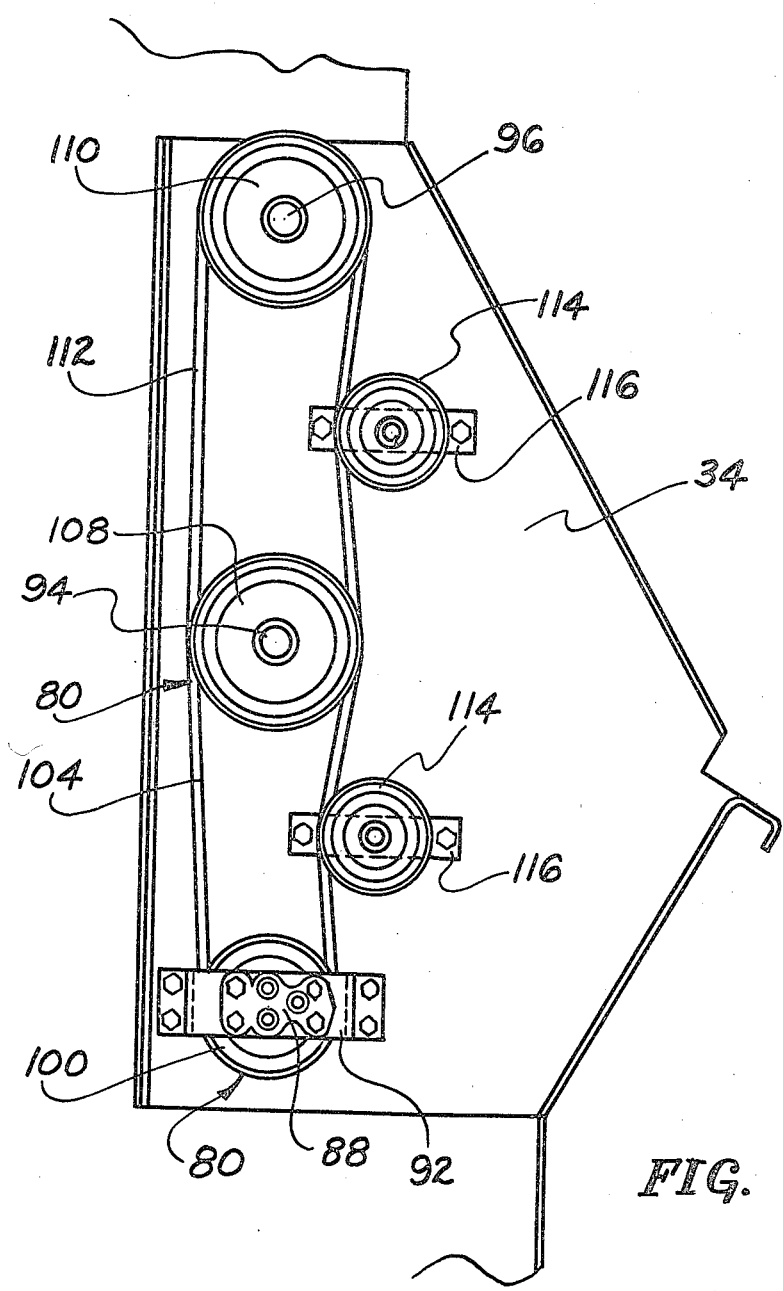
FIG. 6 is a side elevational view of a beater and drive assembly comprising a portion of the vehicle of FIG. 1.
Figure 7:
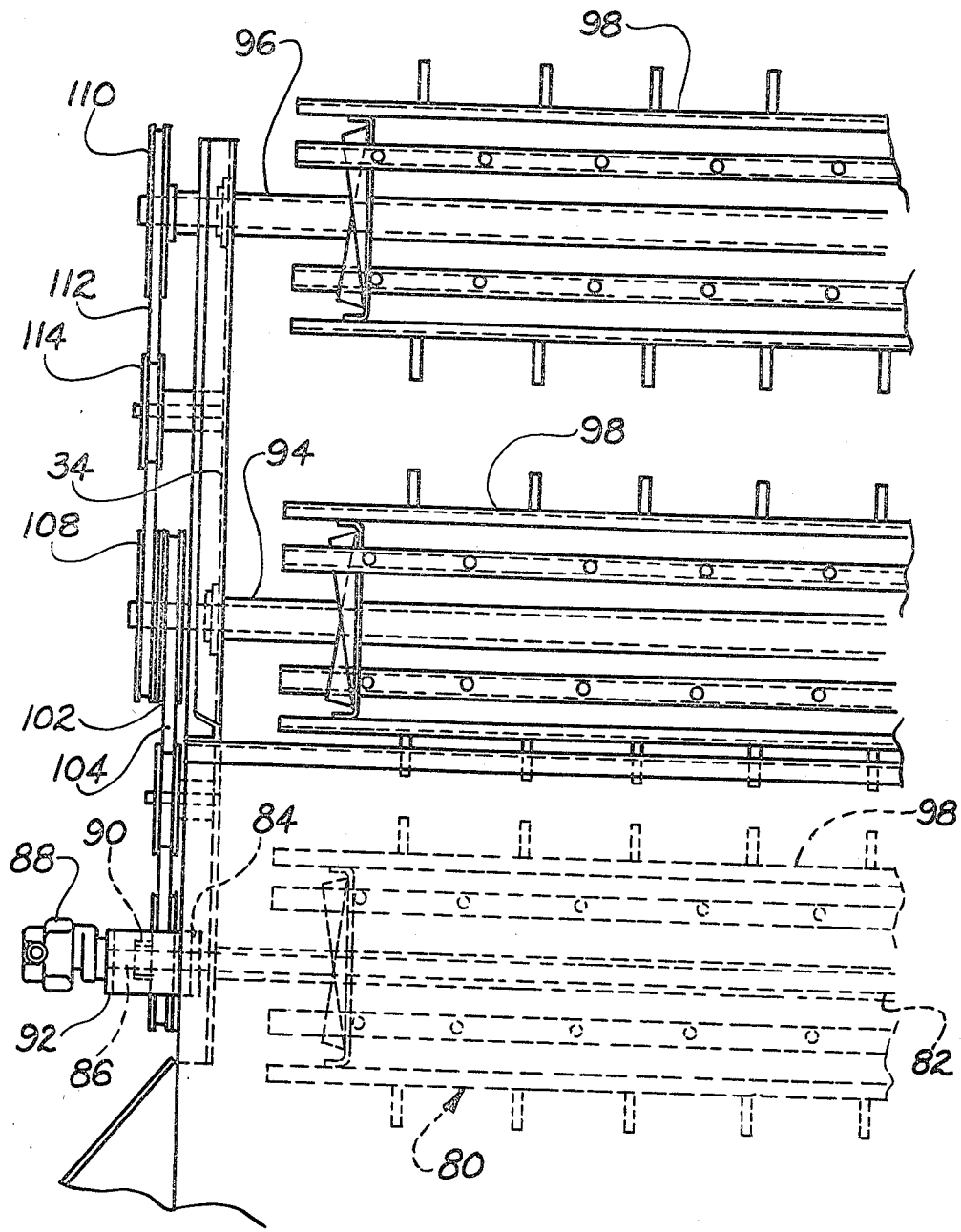
FIG. 7 is a partial front elevational view of the beater and drive assembly of FIG. 6.

Reference is next made to FIGS. 1, 6, and 7 which illustrate a beater means and drive assembly indicated generally at 80 that includes a beater drive shaft 82 journaled to side walls 34 and 36 at bearings 38 and an end of beater drive shaft 82 is attached to the drive shaft 86 of a fluid motor 88 at a coupling 90, said fluid motor being mounted to side wall 34 by a bracket 92 and referred to herein as the beater means fluid motor.

Referring again to FIG. 7 beater assembly 80 further includes additional vertically superimposed beater shafts 94 and 96 on which are mounted the beater devices 98.

As best seen in FIG. 6, beater shaft 94 is driven by pulleys 100 and 102 and a VV belt 104. Similarly, beater shaft 96 is driven by pulleys 108 and 110 and a V belt 112.

The beater assembly further includes idler pulleys 114 mounted to side wall 34 by brackets 116.

Figure 8:
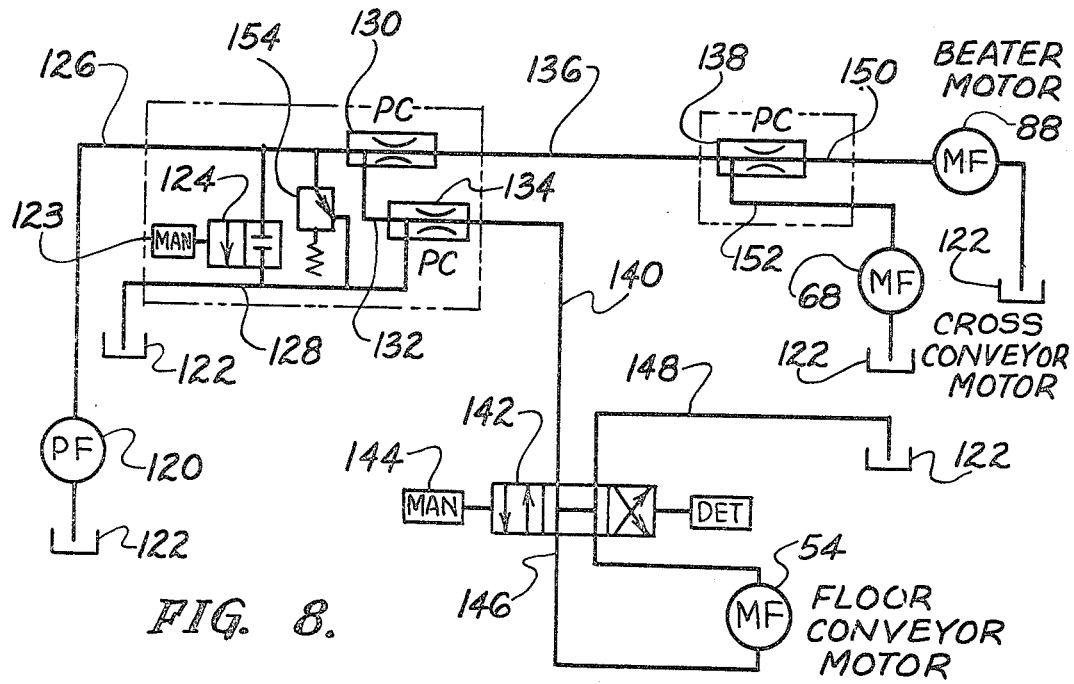
FIG. 8 is a diagrammatic view of a hydraulic apparatus comprising a portion of the vehicle of FIG. 1.

Reference is next made to FIG. 8 which diagrammatically illustrates a hydraulic apparatus adapted for energizing and controlling the fluid motors 54, 68 and 88 previously described. Pressurized fluid is delivered from a hydraulic pump 120, which may be of the fixed displacement type, said pump including an inlet communicating with a hydraulic reservoir 122.

With continued reference to FIG. 8, a manually actuated "on-off" valve 124 receives pressurized fluid from pump 120 via line 126, said valve having its outlet connected back to reservoir 122 via a line 128.

When "on-off" valve 124 is opened, fluid from pump 120 is circulated directly back to tank. However, when valve 124 is closed pressurized fluid is delivered to a first fluid controller 130 which is preferably in the form of a variable pressure compensated flow divider. The function of controller 130 is to divide the total volumetric flow from the pump between a line 132 leading to a second fluid controller 134 and a line 136 leading to a third fluid controller 138.

Fluid controller 134 may be in the form of a variable pressure compensated flow divider which divides the flow from first fluid controller 130 between line 128 leading back to tank and a line 140 which is connected with the inlet of an open center reversing valve 142 of the type that has all its ports open to tank. Reversing valve 142 includes a manual actuator 144 and an outlet connected to line 146 the latter being connected to floor conveyor fluid motor 54. The outlet of the fluid motor 54 is returned to reversing valve 142, said valve including an outlet connected to line 148 which leads back to reservoir 122.

As seen in FIG. 8, line 126 leading from the outlet of the pump can be short circuited back to reservoir 122 via a pressure relief valve 154, said valve serving the function of preventing overloading of the hydraulic circuit in the event one of the conveyors or beaters should suddenly become jammed by a stone or the like.

It should be mentioned that for reasons of simplicity and economy, the above mentioned third fluid controller 138 may be of the fixed pressure compensated type whereby the portion of the flow delivered to it is divided in a fixed manner between fluid motors 89 and 68 such that a proportional speed is always maintained between beater motor 88 and cross conveyor motor 68. However, due to the previously mentioned variable characteristics of first fluid controller 130 and second fluid controller 134, it is possible to selectively vary the volumetric proportion of the total flow which is delivered to floor conveyor motor 54 with respect to the other proportion of the flow delivered via line 136 to beater motor 88 and cross conveyor motor 68.

In operation of the hydraulic apparatus of FIG. 8, pressurized fluid from pump 120 is delivered to "on-off" valve 124 which, when open, merely circulates the fluid back to reservoir 122. When the operator actuates manual control 123 to close valve 124, the total volumetric flow of fluid, any, for example, ten gallons a minute, is delivered to variable fluid controller 130 where the flow is divided in accordance with the setting of a manual control knob, not illustrated. This sends a portion of the flow, for example five gallons a minute, to the third fluid controller 138 where it is divided, at a fixed proportion between beater motor 88 and cross conveyor motor 68.

The other portion of the total ten gallon volumetric flow, which in this example would be five gallons per minute, is sent to second fluid controller 134 where such five gallons is divided, for example, two and one-half gallons to the floor conveyor motor 54 and two and one-half gallons back to reservoir 122 via line 128. Since second fluid controller 134 is variable it is an easy matter for the operator to vary the speed of the floor conveyor motor 54 by merely actuating a control knob, not illustrated.

With continued reference to FIG. 8, when the operator desires to cut down the portion of the total flow being delivered to the beater motor 88 and cross conveyor motor 68 it is merely necessary to actuate the control knob of first fluid controller 130 thereby decreasing the five gallon portion of the flow to any three gallons per minute.

This would, of course, increase the volumetric delivery to the second fluid controller 134 but it in turn can be adjusted by means of an adjusting knob to return any desired portion back to reservoir 122 via line 128.

With continued reference to FIG. 8, when it is desired to stop fluid conveyor motor 54 the operator merely actuates manual actuator 144 to center the valve wherein all four ports communicate with tank. This permits floor conveyor motor 54 to "free wheel" with the result that floor conveyor 42 and the sprocket and shaft mechanism on which it is mounted can continue to move until the friction of the floor conveyor mechanism brings it to a relatively gradual stop. This prevents any sudden hydraulic shocks on the floor conveyor and drive when reversing valve 142 is actuated to stop the conveyor.

With continued reference to the reversing valve 142, it will be noted from the standard symbols that the circuit to the motor 54 can be reversed merely by shifting the manual actuator 154 to the left as seen in FIG. 8.

Referring again to FIG. 8, in the event that either of the conveyors or beater should encounter an obstruction, with a resulting rapid rise in hydraulic pressure in the circuit, fluid will be rapidly dumped back to reservoir 122 via pressure relief valve 154 which can be set at any predetermined maximum pressure value.

Figure 9:
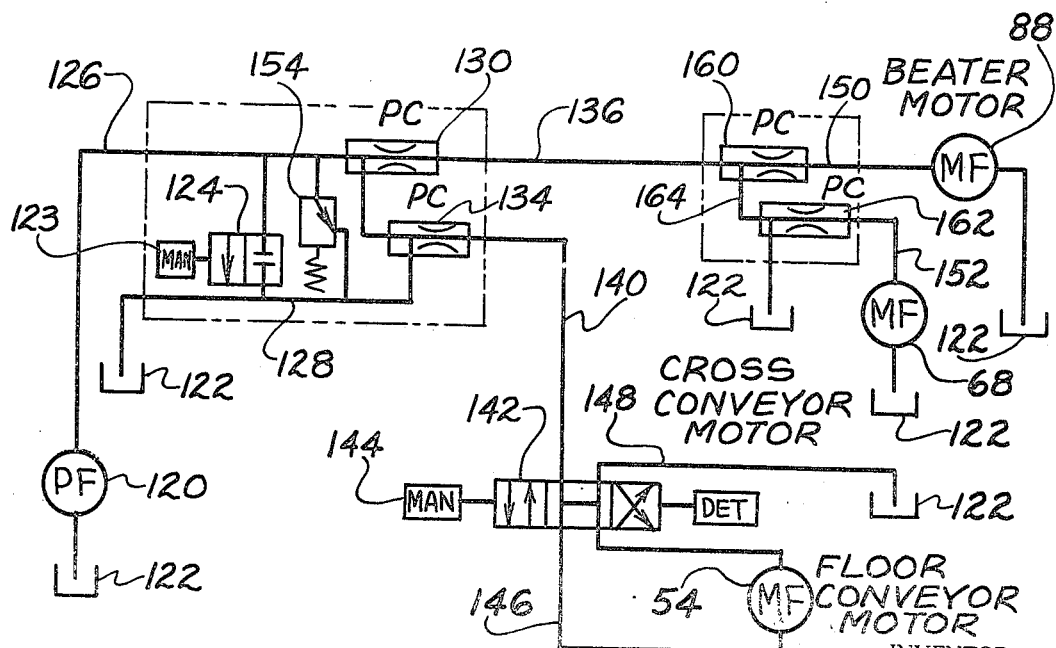
FIG. 9 is a diagrammatic view showing a modified hydraulic apparatus similar to the one illustrated in FIG. 8.

Reference is next made to FIG. 9, which illustrates a modified hydraulic apparatus which can be substituted for the apparatus of FIG. 8 previously described. The apparatus of FIG. 9 is identical to the one of FIG. 8 except that the single fixed pressure compensated fluid controller 138 is replaced by a more complex and hence more expensive fluid control means in the form of two separate variable pressure compensated fluid controllers 160 and 162.

As seen in FIG. 9, fluid controller 160 can be selectively adjusted by means of a control knob, not illustrated, to vary the proportion of the total flow divided between outlet line 150 leading to the beater motor and outlet line 164 leading to the floor conveyor motor via lower fluid controller 162.

Lower fluid controller 162 can be in turn selectively adjusted by means of a control knob, not illustrated, to establish the proportion of its respective flow delivered back to reservoir 122, with respect to the portion of its respective flow that is sent on to cross conveyor motor 68 via line 164.

In view of the above it will be understood that in the embodiment of FIG. 9, the relative speeds of beater motor 88 and cross conveyor motor 68 can be readily varied with respect to one another and independently of the proportion of the total pump flow which is delivered to floor conveyor motor 54.

We claim:

1. A crop and forage vehicle comprising, in combination, frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor for driving said first drive shaft; a cross conveyor fluid motor for driving said second drive shaft; a beater fluid motor for driving said beater means; pressurized conduit means for delivering a flow of pressurized fluid; and hydraulic control means for receiving said flow of pressurized fluid and including control outlet means for delivering said fluid to certain of said motors, said control means being adapted to vary the speed of certain of said conveyors and beater means.

2. A crop and forage vehicle comprising, in combination, frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor for driving said first drive shaft; a cross conveyor fluid motor for driving said second drive shaft; a beater fluid motor for driving said beater means; pressurized conduit means for delivering a flow of pressurized fluid; drain conduit means for receiving said flow from said motors; a first fluid controller including an inlet communicating with said flow and an outlet communicating with one of said motors; a second fluid controller including an inlet communicating with said flow and an outlet communicating with another of said motors, one of said fluid controllers serving to start and stop the flow from said pump to said motors.

3. The apparatus defined in claim 2 that includes a pressure relief valve means including an inlet communicating with the flow from said pump and an outlet communicating with said reservoir means.

4. A crop and forage vehicle comprising, in combination, frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor for driving said first drive shaft; a cross conveyor fluid motor for driving said second drive shaft; a beater fluid motor for driving said beater means; pressurized conduit means for delivering a flow of pressurized fluid; drain conduit means for receiving said flow from said motors; a first fluid controller including an inlet communicating with said flow of pressurized fluid, a first outlet, and a second outlet; a second fluid controller including an inlet communicating with said second outlet of said first fluid controller and an outlet communicating with said floor conveyor motor; a third fluid controller including an inlet communicating with said first outlet of said first fluid controller and a first outlet communicating with said beater motor and a second outlet communicating with said cross conveyor motor; and valve means in said flow of pressurized fluid for starting and stopping the flow from said pump to said fluid motors.

5. The apparatus defined in claim 4 that includes a pressure relief valve means including an inlet communicating with the flow of pressurized fluid and an outlet communicating with said drain conduit means.

6. The apparatus defined in claim 4 wherein said third fluid controller comprises a variable pressure compensated flow divider apparatus.

7. A crop and forage vehicle comprising, in combination, frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor for driving said first drive shaft; a cross conveyor fluid motor for driving said second drive shaft; a beater fluid motor for driving said beater means; pressurized conduit means for delivering a flow of pressurized fluid; drain conduit means for receiving said flow from said motors; a first fluid controller including an inlet communicating with said flow of pressurized fluid, a first outlet, and a second outlet; a second fluid controller including an inlet communicating with said second outlet of said first fluid controller and an outlet communicating with said floor conveyor motor; a third fluid controller including an inlet communicating with said first outlet of said first fluid controller, a first outlet communicating with one of said beater and cross conveyor motors, and a second outlet; a fourth fluid controller including an inlet communicating with said second outlet of said fluid controller, a first outlet communicating with the other of said beater and cross conveyor motors and a second outlet communicating with said reservoir means; and valve means in said flow of pressurized fluid for starting and stopping the flow from said pump to said fluid motors.

8. The apparatus defined in claim 7 wherein said third and fourth fluid controllers are in the form of variable pressure compensated flow divider apparatus.

9. The apparatus defined in claim 7 that includes a pressure relief valve means including an inlet communicating with the flow of pressurized fluid and an outlet communicating with said drain conduit means.

10. A crop and forage vehicle comprising, in combination, frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor fro driving said first drive shaft; a cross conveyor fluid motor for driving said second drive shaft; a beater fluid motor for driving said beater means; pressurized conduit means for delivering a flow of pressurized fluid; drain conduit means for receiving said flow from said motors; a first fluid controller including an inlet communicating with said flow and an outlet communicating with said beater motor and said cross conveyor motor; a second fluid controller including an inlet communicating with said flow and an outlet for controlling the flow through said floor conveyor motor; means for starting and stopping the flow from said pump to said fluid motors; and a control valve in the flow to said floor conveyor motor.

11. The apparatus defined in claim 10 that includes a pressure relief valve means including an inlet communicating with the flow from said pump and an outlet communicating with said drain conduit means.

12. A crop and forage vehicle comprising, in combination, frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor for driving said first drive shaft; a cross conveyor fluid motor for driving said second drive shaft; a beater fluid motor for driving said beater means; pressurized conduit means for delivering a flow of pressurized fluid; drain conduit means for receiving said flow from said motors; a first fluid controller including an inlet communicating with said flow of pressurized fluid, a first outlet, and a second outlet; a second fluid controller including an inlet communicating with said second outlet of said first fluid controller and an outlet communicating with said floor conveyor motor; a third fluid controller including an inlet communicating with said first outlet of said first fluid controller and a first outlet communicating with said beater motor and a second outlet communicating with said cross conveyor motor; valve means in said flow of pressurized fluid for starting and stopping the flow to said fluid motors; and a control valve for the flow through said floor conveyor motor.

13. The apparatus defined in claim 12 that includes a pressure relief valve means including an inlet communicating with the flow of pressurized fluid and an outlet communicating with said drain conduit means.

14. The apparatus defined in claim 12 wherein said third fluid controller comprises a variable pressure compensated flow divider apparatus.

15. A crop and forage vehicle comprising, in combination, frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor for driving said first drive shaft; a cross conveyor fluid motor for driving said second drive shaft; a beater fluid motor for driving said beater means; pressurized conduit means for delivering a flow of pressurized fluid; drain conduit means for receiving said flow from said motors; a first fluid controller including an inlet communicating with said flow of pressurized fluid, a first outlet, and a second outlet; a second fluid controller including an inlet communicating with said second outlet of said first fluid controller and an outlet communicating with said floor conveyor motor; a third fluid controller including an inlet communicating with said first outlet of said first fluid controller, a first outlet communicating with one of said beater and cross conveyor motors, and a second outlet; a fourth fluid controller including an inlet communicating with said second outlet of said third fluid controller, a first outlet communicating with the other of said beater and cross conveyor motors and a second outlet communicating with said drain conduit means; valve means in said flow of pressurized fluid for starting and stopping the flow to said fluid controllers; and a control valve for the flow through said floor conveyor motor.

16. The apparatus defined in claim 15 wherein said third and fourth fluid controllers are in the form of variable pressure compensated flow divider apparatus.

17. The apparatus defined in claim 7 that includes a pressure relief valve means including an inlet communicating with the flow of pressurized fluid and an outlet communicating with said drain conduit means.

18. In a crop and forage apparatus of the type that includes frame means including supporting wheels; body means including side walls, front and rear end walls, and a floor; longitudinal conveyor means mounted on said body means for movement along said floor, said longitudinal conveyor means including a first drive shaft; cross conveyor means mounted on said body means adjacent one of said end walls and including a second drive shaft; beater means mounted on said body means above said cross conveyor and including a third drive shaft; a floor conveyor fluid motor for driving said first drive shaft; a cross conveyor fluid motor for driving said second drive shaft; a beater fluid motor for driving said beater means; the combination of power means for said conveyor and beater means including pump means for delivering a flow of pressurized fluid; conduit means for delivering said flow to said fluid motors; and hydraulic control means in said flow for varying the speed of certain of said fluid motors.

19. The apparatus defined in claim 18 wherein said hydraulic control means includes a first fluid controller having an outlet communicating with an inlet of one of said fluid motors; and a second fluid controller having an outlet communicating with an inlet of another of said fluid motors.

References Cited

UNITED STATES PATENTS

| | | | |
|---|---|---|---|
| 2,967,056 | 1/1961 | D'Amato | 222—178 X |
| 3,181,736 | 5/1965 | Santos | 222—236 X |

STANLEY H. TOLLBERG, Primary Examiner